G. L. GRIMES.
MOLDING MACHINE.
APPLICATION FILED OCT. 14, 1912.

1,130,968.

Patented Mar. 9, 1915.
3 SHEETS—SHEET 1.

Witnesses
Richard C. English
Grace E. Upshaw

Inventor
George L. Grimes
By J. B. Thomas
Attorney

G. L. GRIMES.
MOLDING MACHINE.
APPLICATION FILED OCT. 14, 1912.

1,130,968.

Patented Mar. 9, 1915.
3 SHEETS—SHEET 2.

Witnesses
Richard C. English
Grace E. Klynkoop

Inventor
George L. Grimes
By J. E. Thomas
Attorney

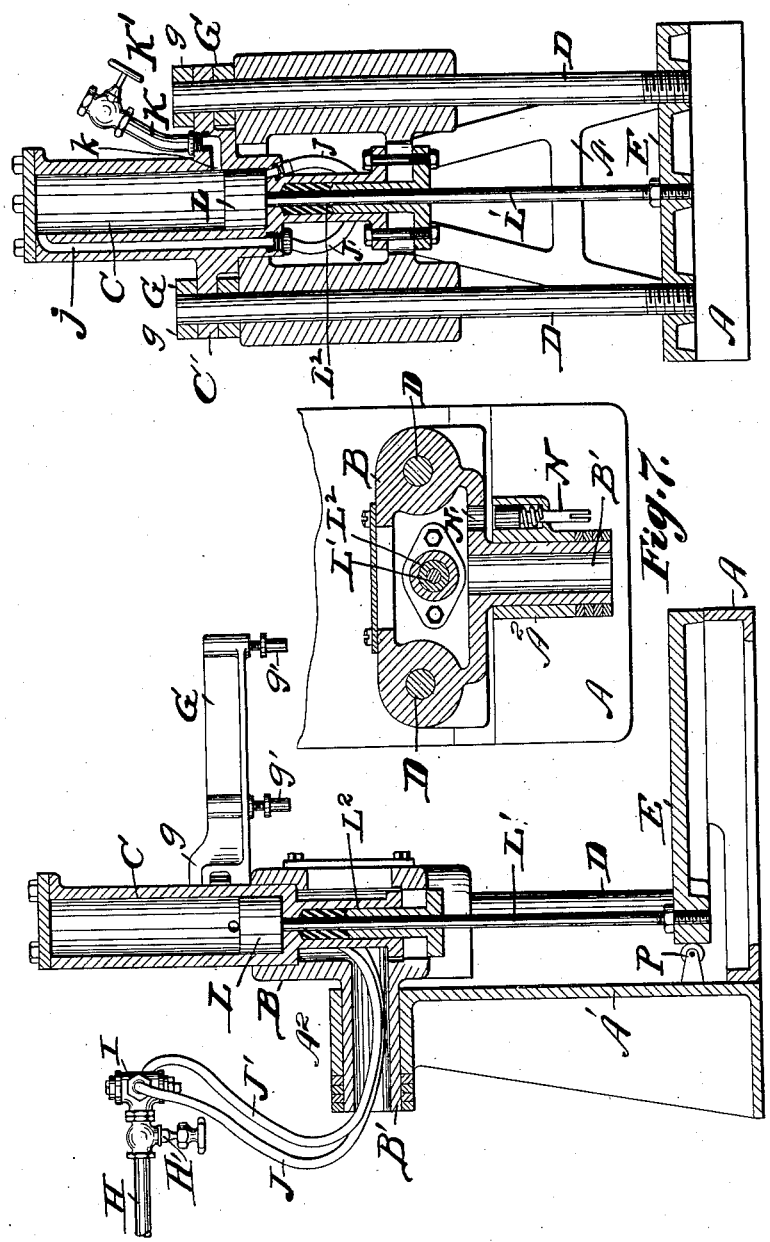

UNITED STATES PATENT OFFICE.

GEORGE L. GRIMES, OF DETROIT, MICHIGAN.

MOLDING-MACHINE.

1,130,968.

Specification of Letters Patent. Patented Mar. 9, 1915.

Application filed October 14, 1912. Serial No. 725,572.

*To all whom it may concern:*

Be it known that I, GEORGE L. GRIMES, citizen of the United States, residing at Detroit, county of Wayne, State of Michigan, have invented a certain new and useful Improvement in Molding-Machines, and declare the following to be a full, clear, and exact description of the same, such as will enable others skilled in the art to which it pertains to make and use the same, reference being had to the accompanying drawings, which form a part of this specification.

My invention relates to an improvement in molding machines, particularly to that class of molding machines in which air pressure is employed to vibrate the mold for the purpose of ramming the sand, as shown in the accompanying drawings, reference being had to the following specification and claims.

One of the objects of the invention is to provide means whereby the board covering the flask may be clamped thereto under air pressure preparatory to reversing the flask.

Another object is to compress the sand in the mold by means of the air pressure.

Other advantages and improvements will hereafter appear.

Figure 2:
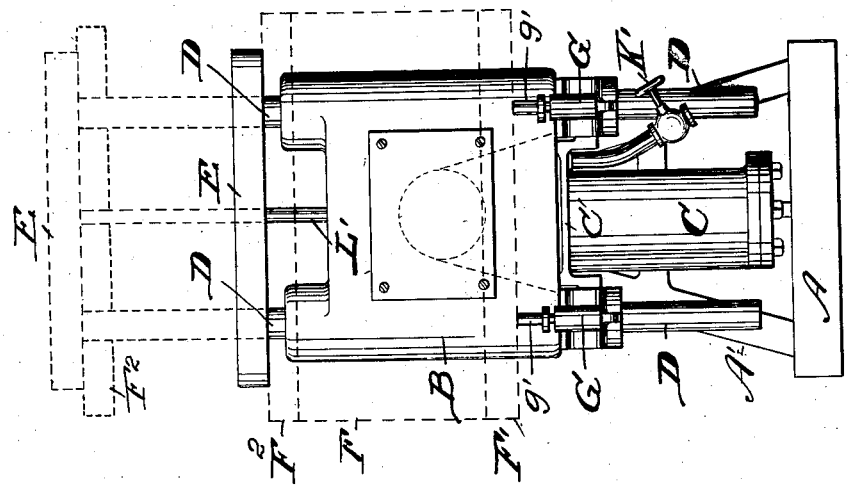
Figure 1:
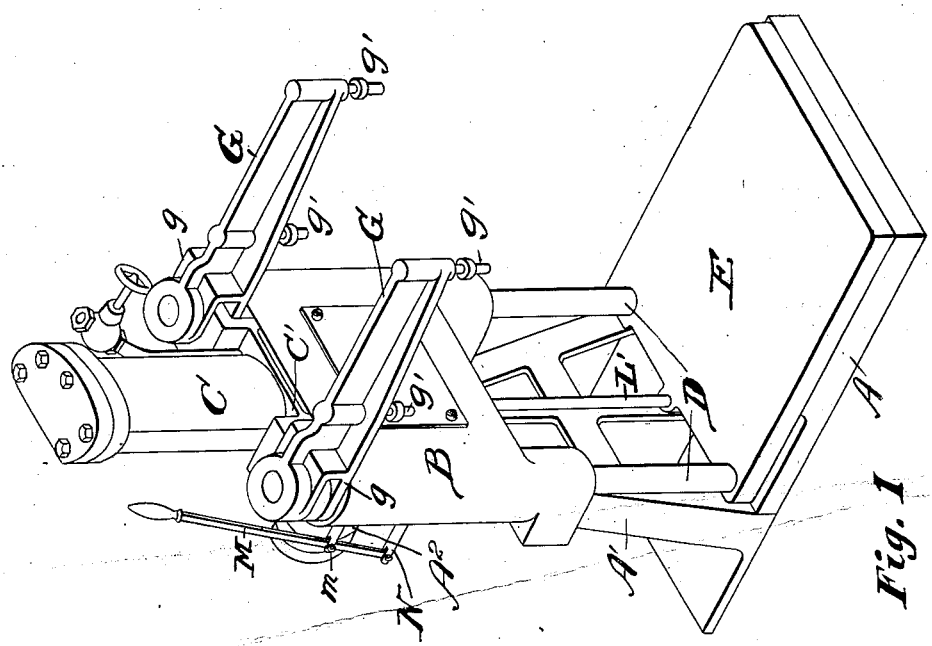
Figure 4:
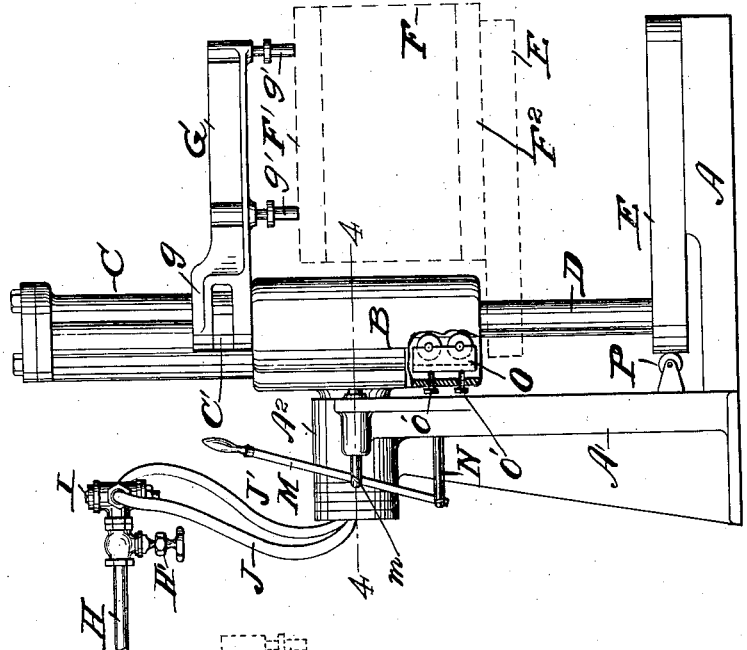
Figure 3:
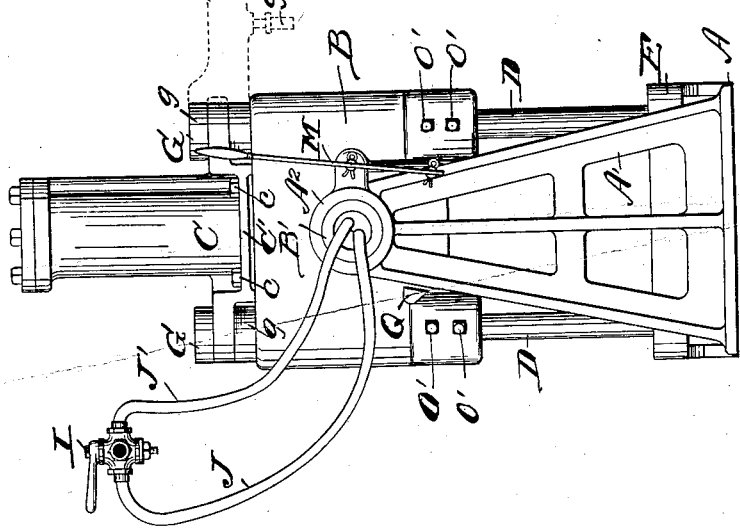

In the drawings accompanying this specification:—Figure 1 is a perspective view of the machine showing the platform in position to receive the pattern and follow board. Fig. 2 is a front elevation of the machine with the mold reversed, and in dotted lines the platform elevated for the removal of the pattern. Fig. 3 is a rear elevation of the machine in the position occupied in Fig. 1, indicating one of the swinging arms in dotted lines in its reversed position. Fig. 4 is a side elevation of the machine with parts broken away, showing in dotted lines the platform elevated and a flask in position. Fig. 5 is a longitudinal vertical section through the machine. Fig. 6 is a cross-sectional view of the machine. Fig. 7 is a horizontal section on line 4—4 of Fig. 4 looking toward the base.

Referring now to the letters of reference placed upon the drawings:—A denotes a suitable base plate, and A' the standard rising from the base provided at its top with a hub or bearing $A^2$, to receive the annular trunnion B', of the revolving head B.

C is a cylinder supported in the end of the head B having a flanged portion C' secured to the head by bolts c. Projecting through perforations provided in the flanged portion C' are guide rods D, the lower ends of which engage a platform E on which the flask F is mounted.

G are swinging arms pivoted to the respective guide rods D, the flanged portion C' projecting between the bifurcated portions g thereof.

g' are adjustable bolts supported in the swinging arms designed to bear upon the board F' carrying the flask.

$F^2$ is a follow board to which the pattern (not shown) is secured.

H is a pipe leading from a compressed air tank (not shown) under control of a valve H'.

I is a four way cock having the usual inlet and exhaust ports.

J is a flexible hose connection leading from the four way cock through the annular trunnion B' to the lower end of the cylinder C. J' is a similar connection from the four way cock to the cylinder connecting with the port $j$ in turn opening into the upper end of the cylinder.

K is a pipe leading from the exhaust port $k$ under control of a valve K'.

L is a piston housed within the cylinder C, its projecting rod L' extending through a suitable stuffing box $L^2$;—the lower end of the piston rod being secured to the platform E.

M is a manually operated lever pivoted at $m$ to the standard A', its lower end being engaged with a spring actuated bolt N housed in the standard; being in turn adapted to project into the opening N', provided in the revolving head B, whereby the head may be locked against rotation when in its adjusted position.

O, O, denote adjustable cages carrying anti-friction rolls designed to bear against the guide rods D.

O', O', are screw-threaded bolts projecting through the wall of the revolving head and bearing against the cages O to force the rolls into impinging contact with the guide rods.

P is a friction roll supported in a suitable hanger attached to the standard and bearing against the platform E when in its lowermost position.

Q is a stop lug projecting from the back of the revolving head adapted to contact with the standard A' to limit the rotation of the head.

Having indicated the several parts by reference letters, the construction and operation of the machine will be readily understood.

The machine is first brought to the position indicated in Fig. 1;—the follow board with the pattern secured thereto is then mounted upon the platform E with a flask properly adjusted and held against displacement in the usual manner. Sand is now placed within the flask and air—under pressure—admitted to the cylinder below the piston L, by the adjustment of the valve H' and the four way cock I;—whereupon the piston will be forced upward carrying with it the platform E on which the flask is mounted. Upon the piston uncovering the port $k$ the air will exhaust through the pipe K permitting the platform E with its flask to drop by gravity causing the sand to pack around the pattern. This operation is repeated again and again until the mold is completely formed. When the mold is completely formed the board F' is placed upon the flask, the swinging arms G adjusted in position over the flask, and air again admitted through the pipe J into the bottom of the cylinder, forcing the platform upward carrying with it the flask as before. The exhaust port $k$, however, is now closed by the valve K', the piston continues therefore to move upward after uncovering the exhaust port until the board F² of the flask is brought into contact with the depending bolts $g'$ of the swinging arms G. These bolts are then adjusted so as to insure a perfect contact between the board and the mold at all points. It will now be obvious that upon a further admission of air under suitable pressure to the cylinder, the platform E with its flask will be forced upward complete pressing the sand in the flask. The board F' covering the flask being now held in position by the pressure of air in the cylinder, the lever M is operated releasing the spring actuated bolt N from locking engagement with the revolving head B; the latter may then be rotated to the reversed position indicated in Fig. 2. The spring bolt N, when released by the controlling lever M, will return into locking engagement with the revolving head, thereby securing the latter against displacement. The four way cock I is next adjusted to exhaust the air through the port J which is now at the top of the cylinder and to admit air through the pipe J' into the port $j$ at the opposite end of the cylinder, forcing the platform E upward thereby lifting the follow board and pattern from the flask. Upon removing the flask, the platform E may be returned to its initial position ready for the formation of a new mold.

Having thus described my invention, what I claim is:—

1. In a molding machine, a revolving frame, a cylinder supported by the frame, a flask carrying platform supported in the frame, a sliding piston in the cylinder connected with the flask carrying platform, swinging projecting arms carried by the frame adapted to bear upon the cover of the flask, means for conveying air into the cylinder, a valve for controlling the delivery of air under pressure to the cylinder to lift the platform, an exhaust port to release the air from the cylinder following the lifting of the platform whereby a vibratory motion may be imparted to the flask, a valve for controlling the discharge of air through the exhaust port whereby the sand in the flask may be compressed and the cover plate of the flask held in position when brought into contact with the projecting arms adapted to bear upon said cover plate, and locking means for securing the revolving frame in its adjusted position.

2. Apparatus of the kind described, comprising a flask holder mounted on a trunnion bearing and with a pressure head coöperative therewith, means for holding the flasks pressed against said pressure head as they are inverted and means for effecting a preliminary jolting of the flask holder.

In testimony whereof, I sign this specification in the presence of two witnesses.

GEORGE L. GRIMES.

Witnesses:
GRACE E. WYNKOOP,
SAMUEL E. THOMAS.